(12) United States Patent
Thakur et al.

(10) Patent No.: US 12,505,162 B2
(45) Date of Patent: Dec. 23, 2025

(54) ACCELERATION OF PRIVILEGE GRAPH TRAVERSAL

(71) Applicant: Veza Technologies, Inc., Los Gatos, CA (US)

(72) Inventors: Tarun Thakur, Los Gatos, CA (US); Maohua Lu, Fremont, CA (US); Robert Whitcher, Erie, CO (US)

(73) Assignee: Veza Technologies, Inc., Los Gatos, CA (US)

( * ) Notice: Subject to any disclaimer, the term of this patent is extended or adjusted under 35 U.S.C. 154(b) by 115 days.

(21) Appl. No.: 18/469,232

(22) Filed: Sep. 18, 2023

(65) Prior Publication Data

US 2024/0095279 A1 Mar. 21, 2024

Related U.S. Application Data

(60) Provisional application No. 63/407,246, filed on Sep. 16, 2022.

(51) Int. Cl.
| | |
|---|---|
| *G06F 16/901* | (2019.01) |
| *G06F 16/903* | (2019.01) |
| *G06F 16/9038* | (2019.01) |
| *G06F 16/242* | (2019.01) |

(52) U.S. Cl.
CPC ........ *G06F 16/9024* (2019.01); *G06F 16/901* (2019.01); *G06F 16/903* (2019.01); *G06F 16/90335* (2019.01); *G06F 16/9038* (2019.01); *G06F 16/2425* (2019.01)

(58) Field of Classification Search
CPC .............. G06F 16/9024; G06F 16/901; G06F 16/9038; G06F 16/90335

USPC ......................................................... 707/769
See application file for complete search history.

(56) References Cited

U.S. PATENT DOCUMENTS

| | | | | |
|---|---|---|---|---|
| 7,499,904 | B2 * | 3/2009 | Gerhard ................ | G06F 16/184 |
| 8,965,991 | B1 * | 2/2015 | McKinnon .............. | H04L 67/51 |
| | | | | 709/206 |
| 9,146,733 | B1 * | 9/2015 | McKinnon ............. | G06Q 10/10 |
| 10,733,055 | B1 * | 8/2020 | Grisby .................. | G06F 16/254 |
| 2012/0259436 | A1 * | 10/2012 | Resurreccion ..... | G05B 19/0428 |
| | | | | 700/17 |
| 2013/0144893 | A1 * | 6/2013 | Voigt ...................... | G06F 16/25 |
| | | | | 707/E17.031 |
| 2013/0268533 | A1 * | 10/2013 | Komarov .............. | G06F 16/953 |
| | | | | 707/E17.03 |
| 2018/0159876 | A1 * | 6/2018 | Park .................... | G06F 16/9024 |
| 2018/0211056 | A1 * | 7/2018 | Delisser .............. | G06F 21/6218 |
| 2020/0050605 | A1 * | 2/2020 | Tung .................. | G06F 16/2379 |
| 2020/0074338 | A1 * | 3/2020 | Florentino ............... | G06N 7/01 |

(Continued)

*Primary Examiner* — Shahid A Alam

(57) ABSTRACT

The technology disclosed herein accelerates traversal of a privilege graph indicating access permissions to resources of data environments. In a particular example, a method provides identifying a first node type of a start node of a plurality of nodes in a privilege graph and a second node type of an end node of the plurality of nodes. The privilege graph indicates access privileges for a plurality of users to features of a plurality of data environments. The method also provides identifying one or more possible paths between the first node type and the second node type based on a schema of the privilege graph and traversing the plurality of nodes from the start node to the end node while ignoring paths that are not included in the one or more possible paths.

20 Claims, 6 Drawing Sheets

(56) References Cited

U.S. PATENT DOCUMENTS

2020/0134362 A1\* 4/2020 Luo .................... G06F 16/9024
2020/0175071 A1\* 6/2020 Ogrinz ................. G06F 16/284
2021/0201198 A1\* 7/2021 Li ....................... G06F 16/9024

\* cited by examiner

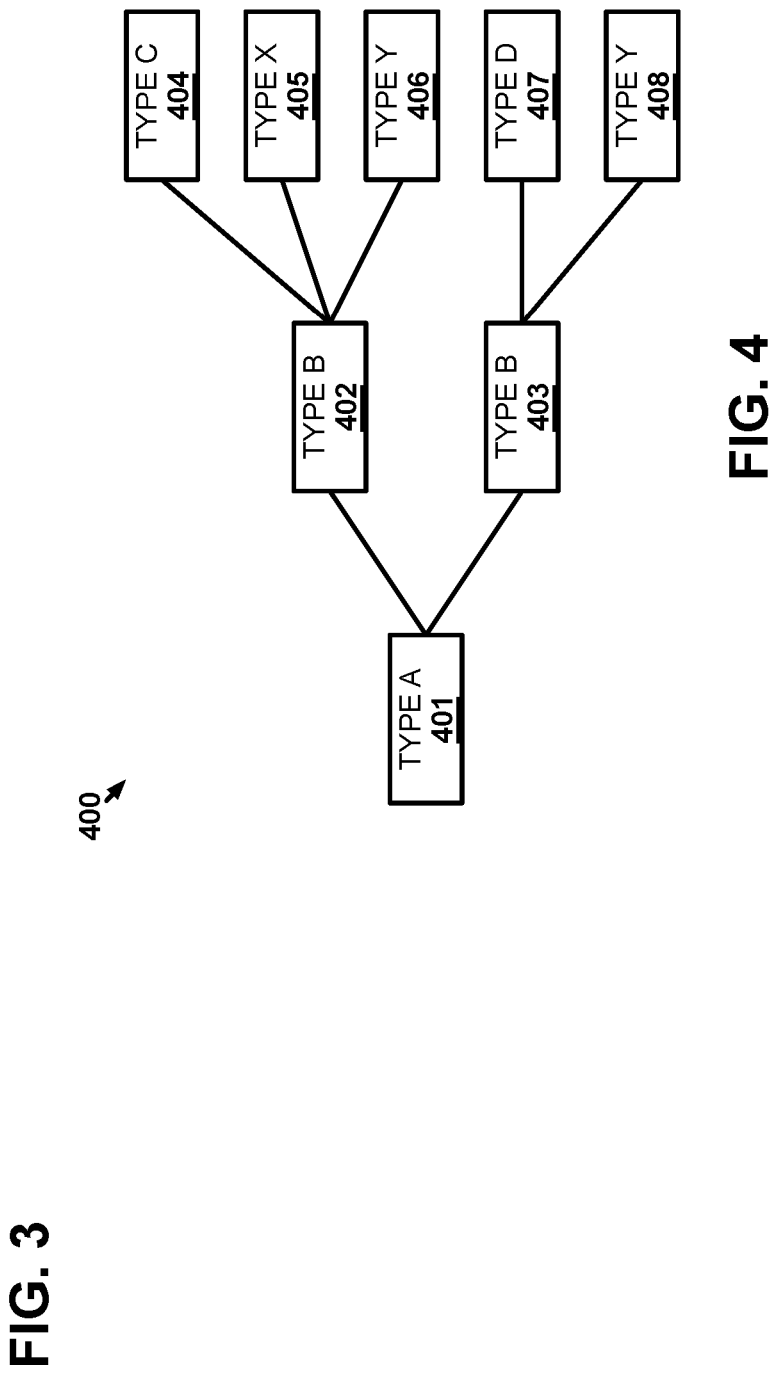

ACCELERATION OF PRIVILEGE GRAPH TRAVERSAL

RELATED APPLICATIONS

This application is related to and claims priority to U.S. Provisional Patent Application 63/407,246, titled "ACCELERATION OF PRIVILEGE GRAPH TRAVERSAL," filed Sep. 16, 2022, and which is hereby incorporated by reference in its entirety.

BACKGROUND

Modern enterprises use numerous data environments to store, manage, and/or process data and those environments may be managed by different systems, applications, and/or platforms from different providers and each may use its own data repository (e.g., database). For instance, different departments may employ different database systems depending on the features offered by the respective system (e.g., accounting may use a first database system while human resources uses a second). In some cases, a single department may itself use multiple platforms for data repositories depending on the capabilities of each platform even if the platforms manage similar data sets. For example, human resources may use one platform to onboard and terminate employees from the enterprise while another platform is used to handle employees' compensation and benefits. The repositories may be hosted local to the enterprise (i.e., at one or more of the enterprise's own facilities) or may be cloud based and hosted by third parties. Likewise, the cardinality of the data environments and the data therein can be very high (on the order of thousands of individual elements, such as data tables, to which a user can potentially access), which makes it very difficult (if not impossible) for a human administrator to track which data can be accessed by which users.

SUMMARY

The technology disclosed herein accelerates traversal of a privilege graph indicating access permissions to resources of data environments. In a particular example, a method provides identifying a first node type of a start node of a plurality of nodes in a privilege graph and a second node type of an end node of the plurality of nodes. The privilege graph indicates access privileges for a plurality of users to features of a plurality of data environments. The method also provides identifying one or more possible paths between the first node type and the second node type based on a schema of the privilege graph and traversing the plurality of nodes from the start node to the end node while ignoring paths that are not included in the one or more possible paths.

In another example, a method provides identifying a start node of a plurality of nodes in a privilege graph. The privilege graph indicates access privileges for a plurality of users to features of a plurality of data environments. The method also provides receiving pagination parameters limiting results returned when traversing the privilege graph from the start node and, while traversing the privilege graph from the start node, returning paginated results in accordance with the pagination parameters.

In other examples, an apparatus performs the above-recited methods and program instructions stored on computer readable storage media direct a processing system to perform the above-recited methods.

BRIEF DESCRIPTION OF THE DRAWINGS

FIG. 3 illustrates a schema for accelerating node traversal in a privilege graph.

FIG. 4 illustrates a subgraph for accelerating node traversal in a privilege graph.

DETAILED DESCRIPTION

Modern enterprises use numerous data environments to store, manage, and/or process data and those environments may be managed by different systems, applications, and/or platforms from different providers and each may use its own data repository (e.g., database). For instance, different departments may employ different database systems depending on the features offered by the respective system (e.g., accounting may use a first database system while human resources uses a second). In some cases, a single department may itself use multiple platforms for data repositories depending on the capabilities of each platform even if the platforms manage similar data sets. For example, human resources may use one platform to onboard and terminate employees from the enterprise while another platform is used to handle employees' compensation and benefits. The repositories may be hosted local to the enterprise (i.e., at one or more of the enterprise's own facilities) or may be cloud based and hosted by third parties. Likewise, the cardinality of the data environments and the data therein can be very high (on the order of thousands of individual elements, such as data tables, to which a user can potentially access), which makes it very difficult (if not impossible) for a human administrator to track which data can be authorized by which users.

Each of the environments discussed above uses its own mechanisms to regulate which users (e.g., humans, systems, applications, or other type of data accessing entity) have access to which features and which data. That is, the mechanisms regulate the privileges that each user has for accessing each data environment and prevent users who are not authorized to access certain features or data from doing so. As such, each environment needs to receive information defining the privileges for each user that is authorized to access at least a portion of the features/data available therefrom. To automatically manage user privileges across a multitude of data environments, the graphing service described herein uses a privilege graph to track users and corresponding privileges.

Figure 1:
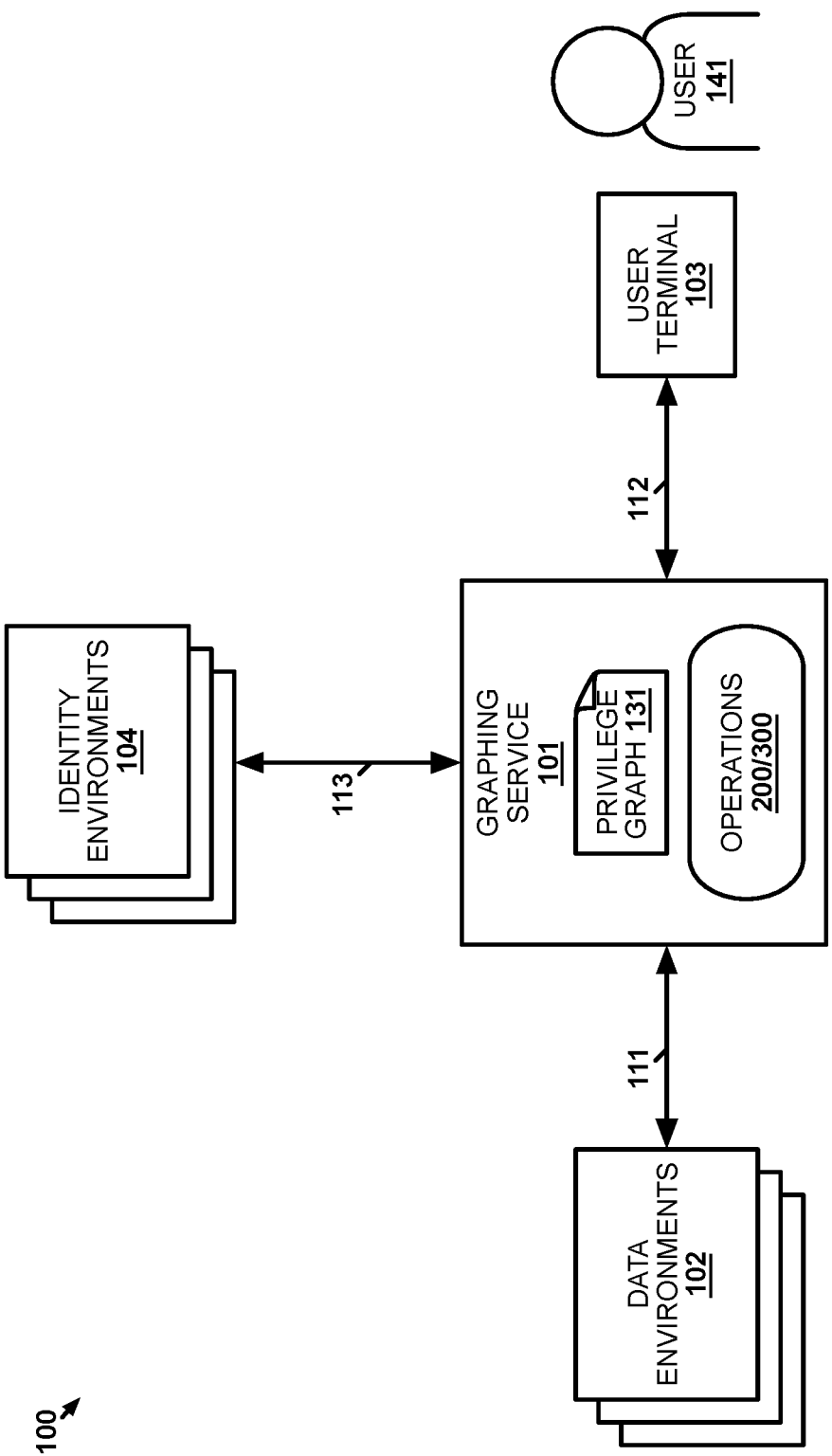
FIG. 1 illustrates an implementation for accelerating node traversal in a privilege graph.

FIG. 1 illustrates implementation 100 for accelerating node traversal in a privilege graph. Implementation 100 includes graphing service 101, data environments 102, user terminal 103, and identity environments 104. Graphing service 101 and data environments 102 communicate over respective communication links 111. Graphing service 101 and user terminal 103 communicate over communication link 112. Graphing service 101 and identity environments 104 communicate over respective communication links 113. While communication links 111-113 are shown as direct links, communication links 111-113 may include intervening systems, networks, and/or devices. Graphing service 101 executes on one or more computing systems, such as server systems, having processing and communication circuitry to operate as described below. User terminal 103 is a user operated computing system, such as a desktop workstation, laptop, tablet computer, smartphone, etc., that user 141 uses to access data environments 102.

In operation, graphing service 101 generates privilege graph 131, which tracks authorizations defined in identity environments 104 and corresponding ones of data environments 102. Identity environments 104 include one or more systems that maintain information about users (e.g., user identity information, user attributes, etc.) and information about which of data environments 102 (including specific data/features therein) each user is allowed to access. Identity environments 104 may include an active directory (AD) server, a privilege access management (PAM) system, human resources management system (HRMS), identity and access governance (IAG) system, or any other type of system that maintains the user information discussed above. By tracking the authorization of many, if not all, users in an organization (e.g., business enterprise), privilege graph 131 is able to not only represent authorizations for particular users but also represent authorizations based on attributes of users (e.g., the user's role and/or group). For example, when traversing privilege graph 131 using attributes of a user to determine subsequent nodes in the traversal. The subsequent nodes are representative of attributes that the user has, or is associated with, which are indicative of which features of data environments 102 the user can access. Privilege graph 131 may be stored local to graphing service 101 or may be accessible to graphing service 101 from an external data repository, which may itself be managed by one of data environments 102.

Graphing service 101 performs operation 200 described below to accelerate traversal of nodes in privilege graph 131. The acceleration relies upon the schema used to define the structure of privilege graph 131. In particular, when graphing service 101 aggregates privilege information from the various sources of data environments 102 and identity environments 104, the sources may all use different conventions and formatting to define the privileges afforded to various users. Graphing service 101 uses a canonical schema to reformat the permissions indicated in the privilege information into one canonical format. For example, different sources may use different names for the same user or different names for the same attribute. The schema defines a particular name convention that should be used for both the user and the attribute. Similarly, the schema may define five canonical privileges: 1) Data Read, 2) Data Write, 3) Metadata Read, 4) Metadata Write, and 5) Non-Data, which break down the privileges that are afforded in the privilege information to their essence (e.g., User X has data-write permission to resource Y). It is easier for graphing service 101 to store, review, categorize, or otherwise process permissions using the schema rather than using the original permission formats.

Of particular relevance to operation 200, the schema further defines the structure of privilege graph 131. That is, the schema defines which node types (e.g., attributes, users, permissions, etc.) connect (i.e., have graph edges) to other node types. For example, the schema may define that nodes of a particular attribute type (e.g., employee workgroup) will only be followed by nodes of one or more particular attribute types. The structural aspects of the schema may be generated as privilege graph 131 is created. That is, the schema may act as metadata describing the connections in privilege graph 131 between node types as new connections are made and nodes are added to privilege graph 131. For example, if the schema indicates that connections only occur between a node of type A and nodes of type B and C, then that is the result of privilege graph 131 simply not having any connections therein from nodes of type A to nodes of types other than B and C. Referencing the schema information before or during traversal of privilege graph 131 enables graphing service 101 to avoid traversing paths that the schema indicates will be dead ends prior to reaching a desired end-node type.

When graphing service 101 updates privilege graph 131, graphing service 101 also updates the schema to ensure the schema properly represents which node types are connected within privilege graph 131. For example, if an edge in privilege graph 131 is created between node types that were not previously connected in privilege graph 131 before, then graphing service 101 updates the schema to indicate that traversal can now occur between the two node types. Conversely, if an edge is removed in privilege graph 131 between two node types that are not connected by any other edges, then graphing service 101 updates the schema to indicate that traversal will not occur between the two node types.

Figure 2:
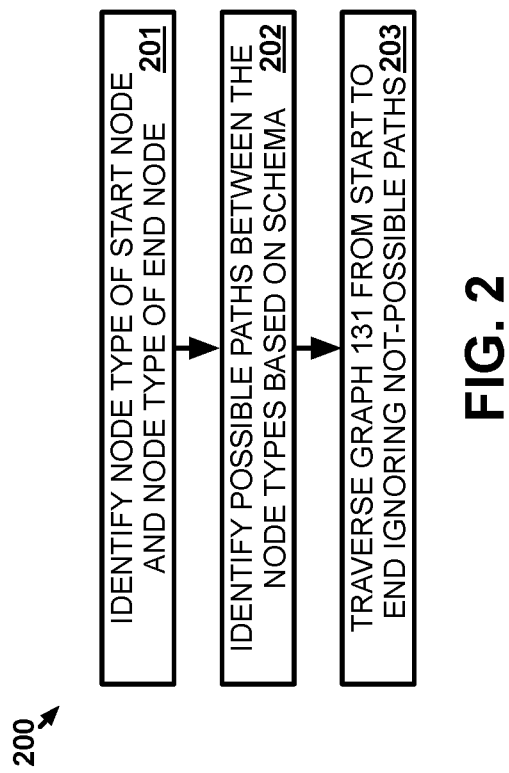
FIG. 2 illustrates an operation to accelerate node traversal in a privilege graph.

FIG. 2 illustrates operation 200 to accelerate node traversal in a privilege graph. In operation 200, graphing service 101 identifies a first node type of a start node in privilege graph 131 and a second node type of an end node in privilege graph 131 (201). A user, such as user 141, may indicate the two types to graphing service 101 (e.g., through user terminal 103). In some examples, graphing service 101 may receive a query for information indicated by the privilege graph and the query may indicate the two node types. For instance, the query may ask which data-read privileges an employee in a workgroup have. The start-node type is a node in privilege graph 131 for the workgroup (the workgroup itself may define the type) and the end-node type is a node that points to resources to which data-read access is allowed.

Graphing service 101 identifies one or more possible paths between the first node type and the second node type based on the schema of privilege graph 131 (202). As described above, the schema provides information on the node connections that exist in privilege graph 131. While the schema does not indicate the specific path between the start node and the end node, it does indicate paths available in privilege graph 131 between nodes of the start-node type and nodes of the end-node type. Thus, the possible paths determined by graphing service 101 are not paths through specific nodes but, rather, through node types.

Graphing service 101 traverses privilege graph 131 from the start node to the end node while ignoring paths that are not included in the one or more possible paths (203). If traversal reaches an edge to a node of a type that is not included in one of the potential paths (or at least not included at that point in the path), the graphing service 101 will know not to waste computational resources following that edge in the traversal (i.e., will ignore that path). By not following paths that are known to not reach a node type of the end node, graphing service 101 can return results faster than had the path been followed without a result. In some examples, the possible path identification and the node traversal may be performed in conjunction. For instance, when graphing service 101 reaches a node, graphing service 101 may determine the node's type and check the schema for which nodes-types are possible for the next step in the traversal.

Graphing service 101 only follows edges to nodes of a type that the schema indicates can possibly connect to the desired end nodes.

While graphing service 101 performs operation 200 in the above example, another system with access to privilege graph 131 may perform operation 200 instead. For instance, while graphing service 101 may generate and maintain privilege graph 131, user terminal 103, or some other computing system, may perform operation 200 on privilege graph 131.

In some examples, graphing service 101 may be used as a layer of security for accessing resources in data environments 102. For example, graphing service 101 may receive a request to access a resource from a user (e.g., system, application, human, etc.). Traversal of privilege graph 131 indicates to graphing service 101 what permissions, if any, the user has to access the requested resource (e.g., read, write, etc.). Graphing service 101 may then provide the user with access to the requested resource in accordance with the permissions identified during the traversal. To allow access, graphing service 101 may notify the one of data environments 102 to allow the user to access the resource in accordance with the permissions or graphing service 101 may act as a gatekeeper only allowing the request to reach the data environment if the user has permission to access the resource. In the latter example, the data environment would then still perform its own access determination for the user (e.g., using one of identity environments 104) so there are two layers of security for the resource, which may be beneficial if one is compromised. In examples, where privilege graph 131 indicates user does not have permission to access the resource then providing the user with the requested access in accordance with the permissions may include blocking the user from accessing the resource.

FIG. 3 illustrates schema 300 for accelerating node traversal in a privilege graph. Schema 300 is an example portion of a complete schema for privilege graph 131. In this case, schema 300 is the portion of the complete schema indicating that nodes of type B within privilege graph 131 can include outbound edges to nodes of types W, X, Y, and Z that still lead to the desired node type of the end node. Within privilege graph 131 nodes of type B may include outbound edges to other node types but those paths will not lead to the desired end node (and following those paths would be a waste of resources). Schema 300 is a visualization of what the schema information for may convey. The actual formatting of the information may use any convention that graphing service 101 is configured to read.

FIG. 4 illustrates subgraph 400 for accelerating node traversal in a privilege graph. Subgraph 400 is a portion of privilege graph 131. Subgraph 400 includes nodes 401-408 connected by the edges as shown. Each of nodes 401-408 has a respective node type. When graphing service 101 is traversing privilege graph 131 using the schema for privilege graph 131. In accordance with operation 200, after reaching node 401, graphing service 101 traverses to nodes 402 and 403, which are both type B nodes. Graphing service 101 then references schema 300 to determine which edges to take from nodes 402 and 403. Nodes of types C and D are not included in schema 300. Graphing service 101, therefore, determines that edges to nodes 404 and 407 need not be traversed. Graphing service 101 continues with its traversal through nodes 405-406 and 408. At each of those nodes, graphing service 101 will once again check the schema of privilege graph 131 to determine which subsequent nodes should be traversed. Once the end node of the traversal is reached, graphing service 101 may generate a subgraph of graphing service 101 that includes all the nodes and edges that were traversed between the start node and the end node. In this example, the generated subgraph would not include nodes 404 and 407 and the edges connecting thereto from nodes 402 and 403. The generated subgraph is merged with other subgraphs generated in accordance with the schema to create a complete subgraph of privilege graph 131 in accordance with the schema.

Figure 5:
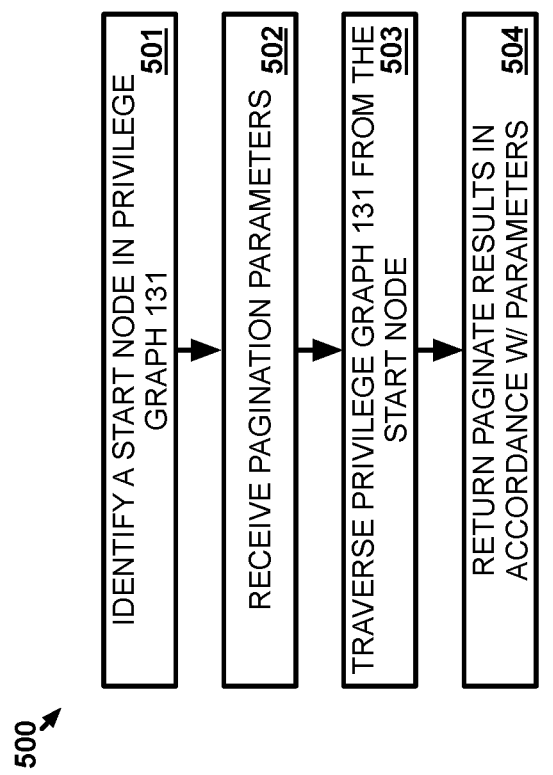
FIG. 5 illustrates an operation to accelerate node traversal in a privilege graph.

FIG. 5 illustrates operation 500 to accelerate node traversal in a privilege graph. Operation 500 is an example of returning results while traversing privilege graph 131 in the manner described above. When graphing service 101 is performing a traversal to return results of a query (e.g., one made by user 141), graphing service 101 may take a large amount of time and/or return an unmanageable number of results in response to the query. This may especially be the case if privilege graph 131 encompasses a large number of nodes. As such, pagination of the results enables the provision of the results in a more manageable format to an entity consuming the results (e.g., user 141) and prevents graphing service 101 from having to return a large set of results, which could slow down its operation.

In operation 500, graphing service 101 identifies a start node in privilege graph 131 (501). The start node may be identified from a query posed by a user to graphing service 101. For example, user 141 may provide a query to graphing service 101 requesting access privileges for users with certain attributes (e.g., with a certain role, in a given workgroup, etc.). Graphing service 101 uses the attributes defined by the query as a start node (or start nodes in some cases). Graphing service 101 further receives pagination parameters limiting the results returned when traversing privilege graph 131 (502). The parameters may include a node return limit that limits the number of nodes returned per page or a time limit that limits the amount of time graphing service 101 performs the traversal before returning a page. The parameters may be included in the query or may be received from some other source.

Graphing service 101 traverses privilege graph 131 from the start node to return results requested by the query (503). While traversing privilege graph 131, graphing service 101 returns paginated results in accordance with the pagination parameters (504). For instance, at each step in the traversal, graphing service 101 creates a page of results. The pages may be displayed by a user system, e.g., user terminal 103, that requested the traversal (e.g., queried graphing service 101). Using subgraph 400 as an example, one page of the results may show node 402 and 403 along with the edges connecting nodes 402 and 403 to nodes 405-406 and 408. In that case, the nodes/edges of the page may be all that graphing service 101 was able to find before moving on to find nodes beyond nodes 402-406 and 408 or the pagination parameters may have limited graphing service 101 to only finding nodes 402-406 and 408 (e.g., may have limited to only three nodes per page or a time limit was reached triggering the page being returned). After returning the aforementioned page, graphing service 101 may continue to traverse privilege graph 131 to generate subsequent pages (e.g., a page showing a subgraph of privilege graph 131 showing child nodes of node 408). In some cases, an empty set may be returned, or nothing may be returned for a page, if nothing is found within the pagination parameters for a page. A user reviewing the results may then step through the returned pages to get a better picture of how an end result is achieved through privilege graph 131.

In some examples, the pagination parameters may include a direction parameter indicating which direction (forward or backward) the traversal should be paginated. In some examples, the pagination may be reversed while in the middle of traversal.

Figure 6:
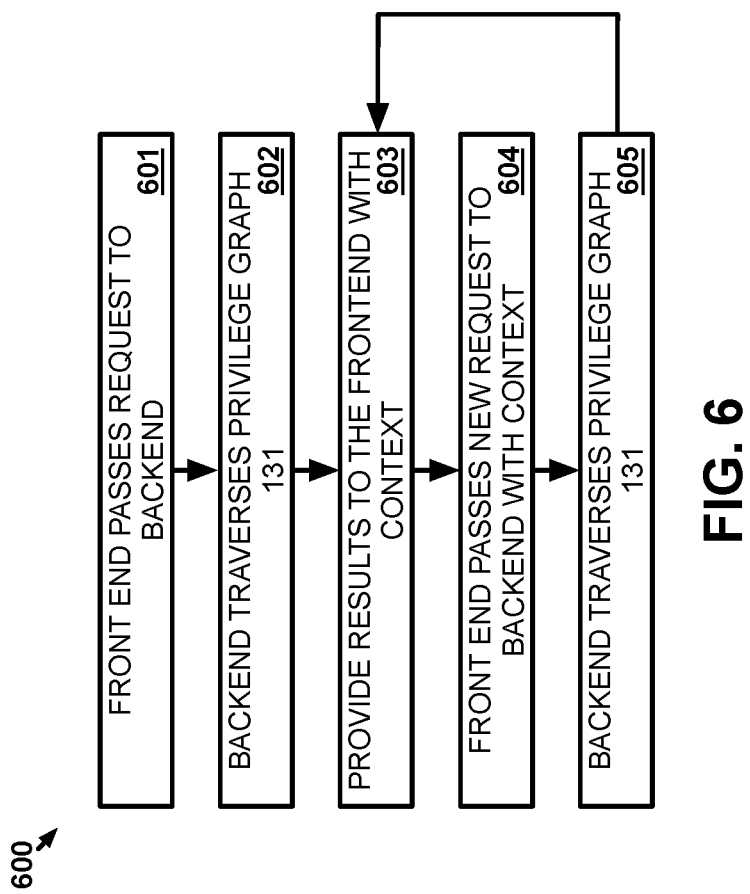
FIG. 6 illustrates an operation to accelerate node traversal in a privilege graph.

FIG. 6 illustrates operation 600 to accelerate node traversal in a privilege graph. Operation 600 is an example of how a frontend and backend of graphing service 101 interact to perform the traversal of privilege graph 131. The frontend is a software component of graphing service 101 that interacts with users, such as user 141, enabling them to access privilege graph 131. The frontend may supply a user interface for privilege graph 131 through which queries are provided and results are presented (e.g., displayed). The backend is a software component that performs search or other action on privilege graph 131 in response to directions from the frontend.

The frontend passes a request with the pagination parameters to the backend (601). The request may ask the backend to traverse privilege graph 131 for results to a query received by graphing service 101. The backend traverses privilege graph 131 in accordance with the pagination parameters (602). When a limit defined by the parameters is reached, the backend provides the results to the frontend (603). The results include a context of the pagination, which defines where the results are located in privilege graph 131 (e.g., where a subgraph formed by the results fits into the overall privilege graph 131). After receiving the results, the frontend passes a new request to the backend (604). The new request includes the pagination parameters and indicates the context such that the backend can continue the traversal of privilege graph 131 from where the frontend desires the backend to continue. The context may indicate a position continuing from the most recent page or from some other location (e.g., another page from which the backend has yet to traverse).

The backend traverses privilege graph 131 in accordance with the pagination parameters and context in the new request (605). Results are then provided to the frontend with context again (603). Steps 603-605 repeat until none of the limitations provided by the pagination parameters are met, which indicates an end has been reached in the traversal and all pages have been provided. By using the pagination parameters, the frontend is provided with results for a query that should be more manageable the backend providing all results of a traversal at once. Pagination can be especially beneficial in situations where privilege graph 131 includes a very large number of nodes.

Figure 7:
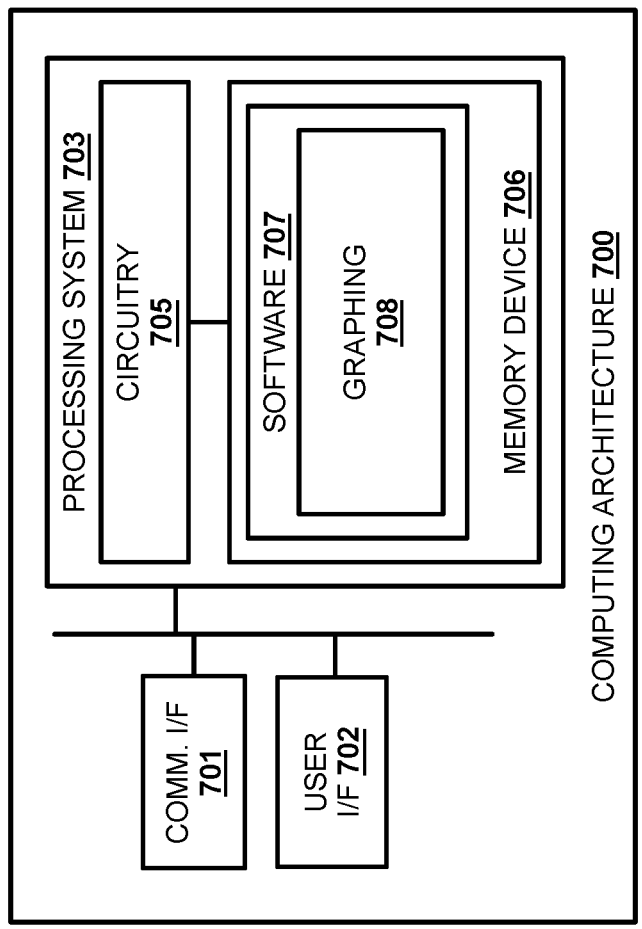
FIG. 7 illustrates a computing architecture for accelerating node traversal in a privilege graph.

FIG. 7 illustrates computing architecture 700 for accelerating node traversal in a privilege graph. Computing architecture 700 is an example computing architecture for implementing graphing service 101. A similar architecture may also be used for other systems described herein, such as user terminal 103, although alternative configurations may also be used. Computing architecture 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises one or more computer readable storage media, such as a disk drive, flash drive, data storage circuitry, or some other memory apparatus—including combinations thereof. In no examples would a computer readable storage medium of memory device 706, or any other computer readable storage medium herein, be considered a transitory form of signal transmission (often referred to as "signals per se"), such as a propagating electrical or electromagnetic signal or carrier wave. Operating software 707 comprises computer programs, firmware, or some other form of machine-readable processing instructions. Operating software 707 includes access graphing module 708. Operating software 707 may further include an operating system, utilities, drivers, network interfaces, applications, or some other type of software. When executed by processing circuitry 705, operating software 707 directs processing system 703 to operate computing architecture 700 as described herein.

In particular, graphing module 708 directs processing system 703 to identify two attribute nodes of a plurality of nodes in a privilege graph. The privilege graph indicates access privileges for a plurality of users to features of a plurality of data environments. Graphing module 708 further directs processing system 703 to determine that the two attribute nodes share the same one or more outbound edges and combine the two nodes into a combined node. The combined node represents attributes represented by the two attribute nodes. Graphing module 708 also directs processing system 703 to trace the privilege graph from a user through the combined node when determining which of the access privileges correspond to the user.

In addition, or as an alternative, to the above steps, graphing module 708 directs processing system 703 to identify a start node of a plurality of nodes in a privilege graph. The privilege graph indicates access privileges for a plurality of users to features of a plurality of data environments. Graphing module 708 further directs processing system 703 to receive pagination parameters limiting the results returned when traversing the privilege graph from the start node. While traversing the privilege graph from the start node, graphing module 708 directs processing system 703 to return paginated results in accordance with the pagination parameters.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for regulating access to computing resources, the method comprising:
   in a graphing service comprising at least one computing system:

receiving a query for information indicated by a privilege graph, wherein the privilege graph indicates access privileges for a plurality of users to features of a plurality of data environments;

in response to receipt of the query, identifying a first node type of a start node of a plurality of nodes in the privilege graph and a second node type of an end node of the plurality of nodes;

receiving pagination parameters limiting results returned when traversing the privilege graph;

referencing a schema of the privilege graph to identify one or more possible paths between the first node type and the second node type, wherein the schema indicates which node types in the privilege graph have connections to other node types in the privilege graph;

traversing the plurality of nodes from the start node to the end node while avoiding paths that the schema indicated are not included in the one or more possible paths; and while traversing the privilege graph, returning paginated results in accordance with the pagination parameters.

2. The method of claim 1, wherein the query indicates the first node type and the second node type.

3. The method of claim 2, comprising:
after traversing the privilege graph, providing the results based on paths traversed.

4. The method of claim 1, comprising:
determining an edge has been created in the privilege graph between two nodes of new types not previously connected; and
updating the schema to enable traversal between the new types.

5. The method of claim 1, wherein the first node type is representative of a user and the second node type is representative of a resource.

6. The method of claim 5, comprising:
after traversing the privilege graph, providing the user with access to at least one resource indicated by traversal of the privilege graph.

7. The method of claim 1, wherein the pagination parameters limit a number of nodes returned per page or limit an amount of time before a page is returned.

8. A method for regulating access to computing resources, the method comprising:
in a backend of a graphing service comprising at least one computing system:
receiving a request for a traversal of a privilege graph from a frontend of the graphing service, wherein the privilege graph indicates access privileges for a plurality of users to features of a plurality of data environments;

identifying a start node type of a start node of a plurality of nodes in the privilege graph and an end node type of an end node of the plurality of nodes;

referencing a schema of the privilege graph to identify one or more possible paths between the start node type and the end node type, wherein the schema indicates which node types in the privilege graph have connections to other node types in the privilege graph;

receiving pagination parameters limiting results returned when traversing the privilege graph from the start node; and while traversing the privilege graph from the start node and ignoring paths the schema indicated are not included in the one or more possible paths, returning paginated results to the frontend in accordance with the pagination parameters.

9. The method of claim 8, wherein the request comprises a query for information indicated by the privilege graph received by the frontend.

10. The method of claim 9, wherein the query includes the pagination parameters and indicates the start node.

11. The method of claim 8, wherein the pagination parameters include at least one of a limit on a number of nodes returned per page and a limit on an amount of time spent traversing the privilege graph before returning a page of the paginated results.

12. The method of claim 8, wherein the pagination parameters indicate a direction of pagination.

13. The method of claim 8, wherein the backend indicates where each page of the paginated results is located in the privilege graph.

14. The method of claim 13, wherein the start node type is representative of a user and the end node type is representative of a resource.

15. The method of claim 14, comprising:
after traversing the privilege graph, providing a user with access to at least one resource indicated by traversal of the privilege graph.

16. One or more computer readable storage media having program instructions stored thereon for regulating access to computing resources, the program instructions, when executed by a processing system, direct the processing system to:
receive a query for information indicated by a privilege graph, wherein the privilege graph indicates access privileges for a plurality of users to features of a plurality of data environments;

in response to receipt of the query, identify a first node type of a start node of a plurality of nodes in the privilege graph and a second node type of an end node of the plurality of nodes;

receive pagination parameters limiting results returned when traversing the privilege graph;

referencing a schema of the privilege graph to identify one or more possible paths between the first node type and the second node type, wherein the schema indicates which node types in the privilege graph have connections to other node types in the privilege graph;

traverse the plurality of nodes from the start node to the end node while ignoring paths that are not included in the one or more possible paths to conserve computational resources of the processing system when determining results for the query; and while traversing the privilege graph, return paginated results in accordance with the pagination parameters.

17. The one or more computer readable storage media of claim 16, wherein the query indicates the first node type and the second node type.

18. The one or more computer readable storage media of claim 17, wherein the query includes the pagination parameters and indicates the start node.

19. The one or more computer readable storage media of claim 16, wherein the pagination parameters include at least one of a limit on a number of nodes returned per page and a limit on an amount of time spent traversing the privilege graph before returning a page of the paginated results.

20. The one or more computer readable storage media of claim 16, wherein the first node type is representative of a user and the second node type is representative of a resource and wherein the program instructions direct the processing system to:
  after traversing the privilege graph, provide a user with access to at least one resource indicated by traversal of the privilege graph.

\* \* \* \* \*